(No Model.) 7 Sheets—Sheet 1.

G. POORE.
COIN CONTROLLED ELECTRIC CALL APPARATUS.

No. 505,724. Patented Sept. 26, 1893.

Fig 1.

Witnesses:
J. A. Rutherford
Robert Errett

Inventor:
Graydon Poore
By James L. Norris.
Attorney.

(No Model.) 7 Sheets—Sheet 2.

G. POORE.
COIN CONTROLLED ELECTRIC CALL APPARATUS.

No. 505,724. Patented Sept. 26, 1893.

(No Model.)

G. POORE.
COIN CONTROLLED ELECTRIC CALL APPARATUS.

No. 505,724. Patented Sept. 26, 1893.

(No Model.) 7 Sheets—Sheet 4.

G. POORE.
COIN CONTROLLED ELECTRIC CALL APPARATUS.

No. 505,724. Patented Sept. 26, 1893.

Fig 4.

(No Model.)  7 Sheets—Sheet 7.

G. POORE.
COIN CONTROLLED ELECTRIC CALL APPARATUS.

No. 505,724.  Patented Sept. 26, 1893.

Witnesses:
J. A. Rutherford
Robert Emmett

Inventor:
Graydon Poore
By James L. Norris
Attorney

UNITED STATES PATENT OFFICE.

GRAYDON POORE, OF LONDON, ENGLAND.

COIN-CONTROLLED ELECTRIC CALL APPARATUS.

SPECIFICATION forming part of Letters Patent No. 505,724, dated September 26, 1893.

Application filed May 16, 1892. Serial No. 433,237. (No model.)

*To all whom it may concern:*

Be it known that I, GRAYDON POORE, a subject of the Queen of Great Britain, residing at 35 Oak Hill Road, Putney, London, in the county of Surrey, England, have invented certain new and useful Improvements in Coin-Controlled Electric Call Apparatus, of which the following is a full, clear, and exact specification.

This invention relates to certain improvements in and relating to that class of call or signaling apparatus in which any given or predetermined signal is electrically transmitted from one place (say a calling station) to another (say a central station) on operation of the apparatus, and has for its object to enable such apparatus to be more conveniently utilized and adapted to the public or a message service than heretofore. According to my improvements I apply to an electric call or signal transmitting apparatus a coin operated mechanism, and I so arrange the internal parts that upon the insertion of a coin or token a part is released and the operator is enabled to pull out a drawer or equivalent device which may bear or contain one of a number of cards, writing materials, or other thing or things applicable for the purpose intended, and contained in the apparatus; this action serves to store up sufficient power by spring, weight, or equivalent action to actuate the transmitting mechanism when required, and the same action, should the line be clear, also serves to release the power storage mechanism and so operates the transmitter and dispatches the signal. If however the line is engaged at the time of the operation the power storage mechanism is not at once released but retained and delayed by suitable self-acting mechanism until the line is clear, thereby preventing the possibility of more than one signal being transmitted through the single wire at one time, and this fact may be indicated by the closing of the money slot until the previous message has been dispatched, or otherwise. The delay may be effected by means of the cutting in or out of circuit of an electro-magnet which the armature of which acting on a catch or other suitable interposed mechanism controls the action of the said power storage mechanism, and is connected to and regulated by suitable timing mechanism. In the case of a system of such apparatus in any district on one circuit, if a signal is being transmitted from any instrument and at the same time power to signal has been stored up in any other or others, the timing apparatus are so set that each will send its signal in turn and no two simultaneously, and on any second signal being sent all the timing mechanisms are retarded. In case of the electric current available being but small relays may be inserted in connection with the electro magnets in the known manner.

The apparatus is provided with an inner receptacle for written messages and also an internal switch or transmitter not accessible to the public, but by which the messenger answering the call on opening the apparatus can also transmit a call or calls to the central station, or by which, assuming the line engaged, he can store up power for that purpose by suitable mechanical means.

Instead of storing up power by the action of the operator as described the same may be effected by means of previously wound clockwork, or by an electro-motor contained in the apparatus worked from the central station with which the instruments are in communication, such stored power being released or allowed to be released by the coin action.

I will now describe my invention in reference to the accompanying drawings in which—

In all these figures similar letters refer to similar parts.

The whole of the hereinafter described mechanisms and goods are inclosed in suitable casings, ordinary and convenient provisions being made for locking, writing, giving directions, and so forth, which are sufficiently indicated in the drawings without letters of reference.

To simplify the description of the invention I have divided it into four main parts, viz: first, the coin-freed locking and operating mechanism; second, the electric call and transmitting or telegraph; third, the timing gear; and fourth, the additional messenger's private call apparatus.

Figure 1:
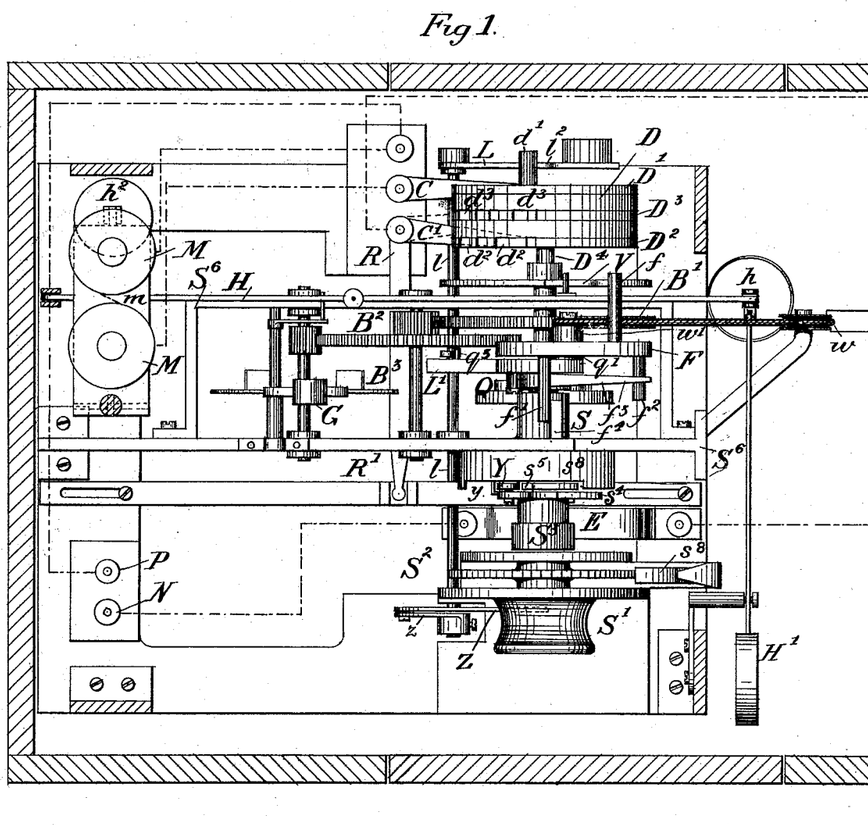
Figure 1 is a plan of the machine taken below the coin-freed locking gear.
Figure 2:
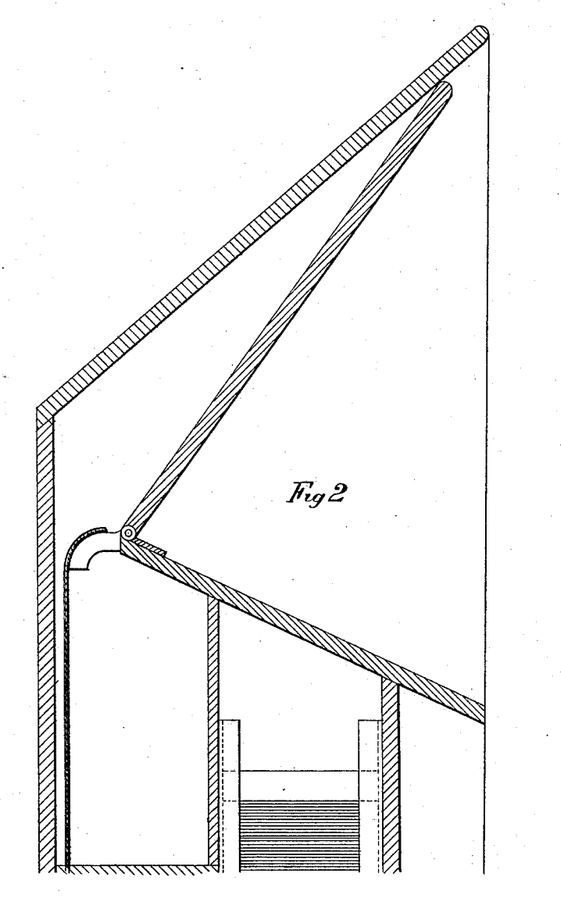
Figs. 2 and 2ª are together a sectional elevation of left side.
Figure 2A:
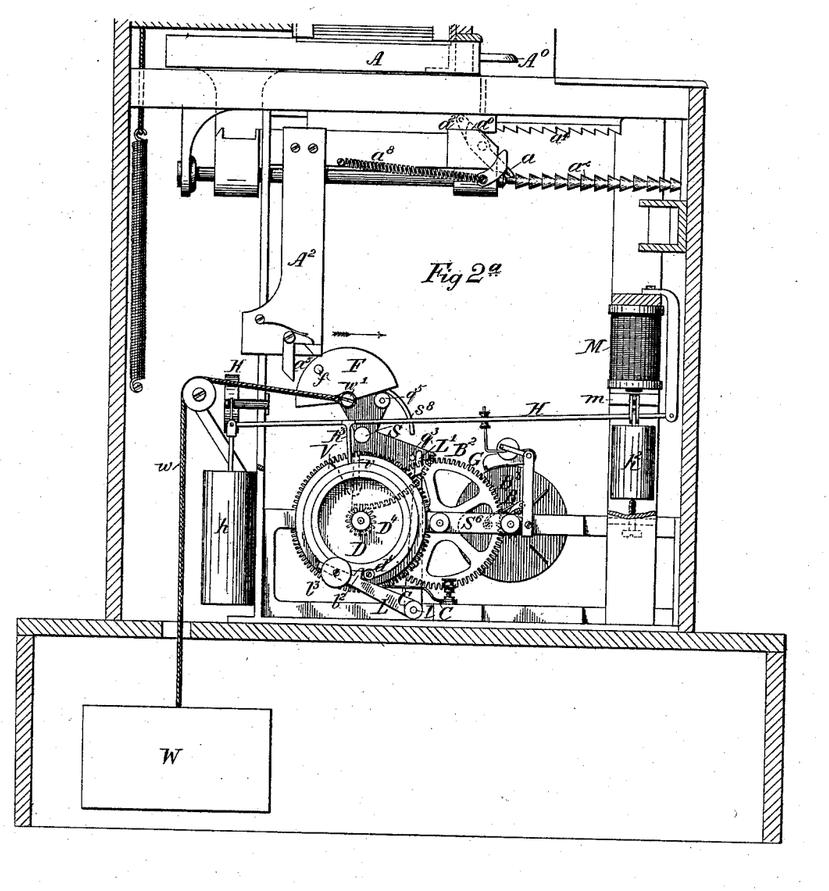
Figure 3:
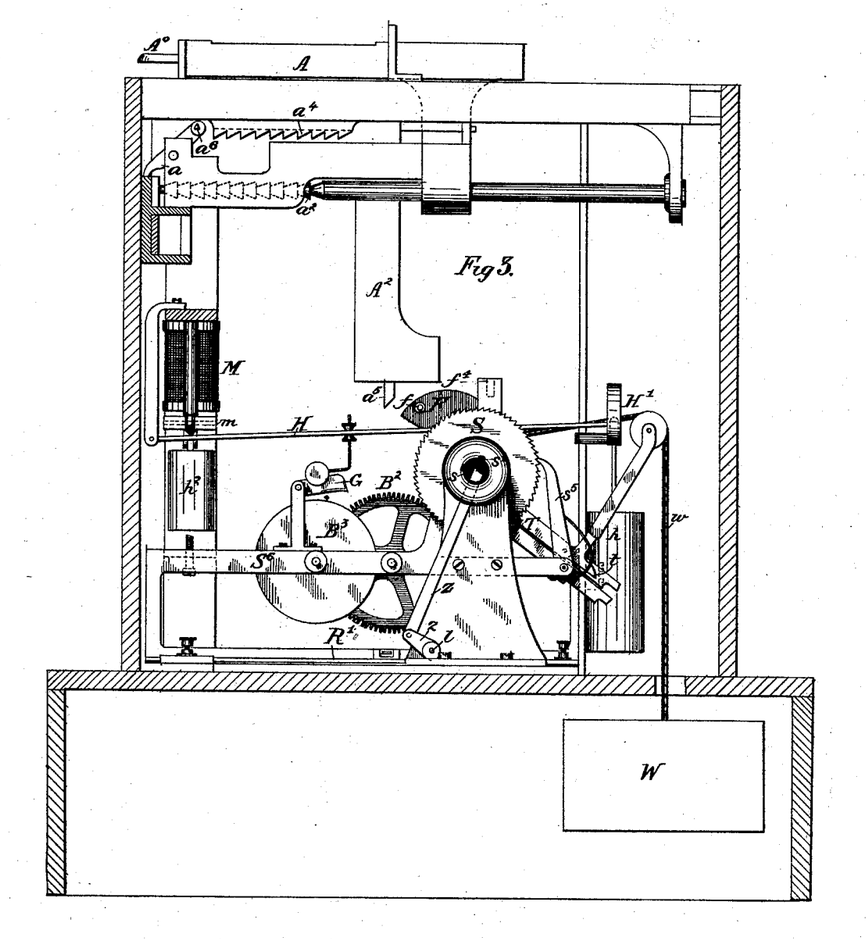
Fig. 3 is a sectional elevation of right side showing the slide withdrawn and power stored, and also the messenger's private call apparatus.
Figure 4:
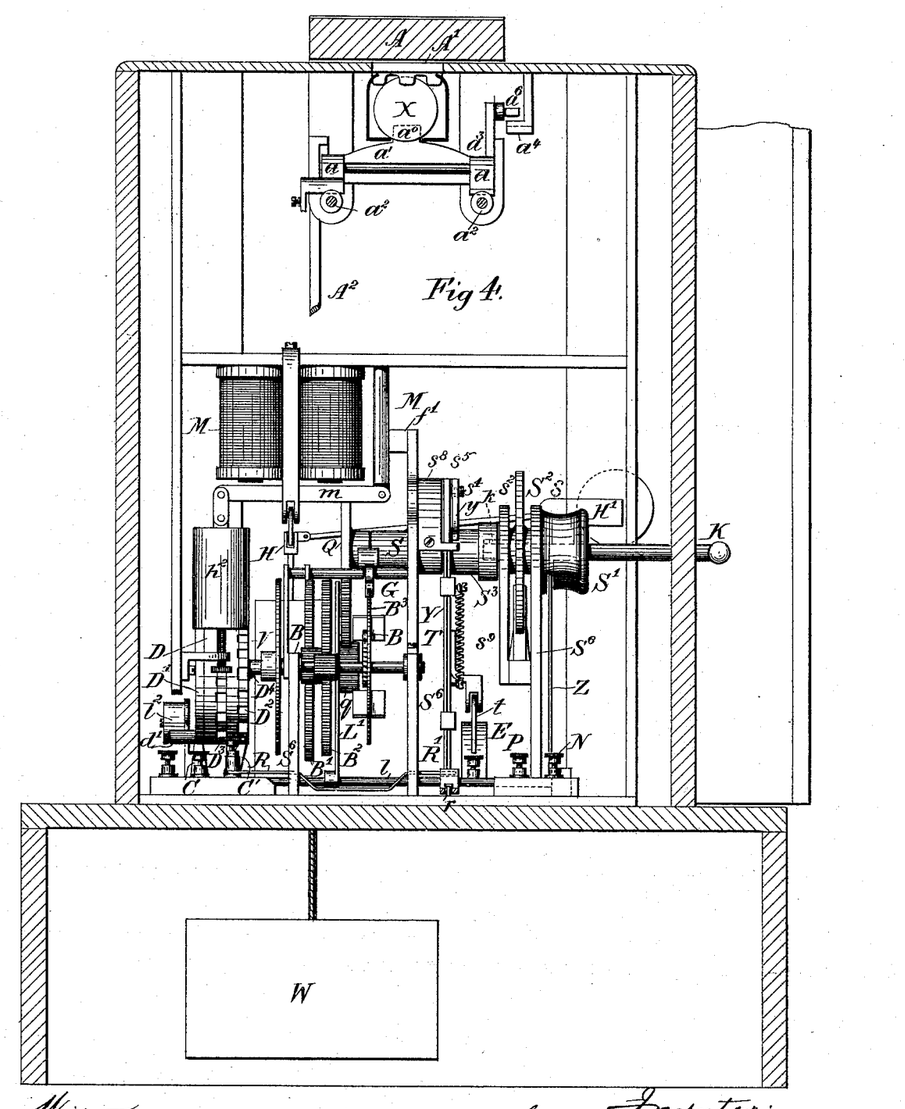
Fig. 4 is a sectional front end elevation.
Figure 5:
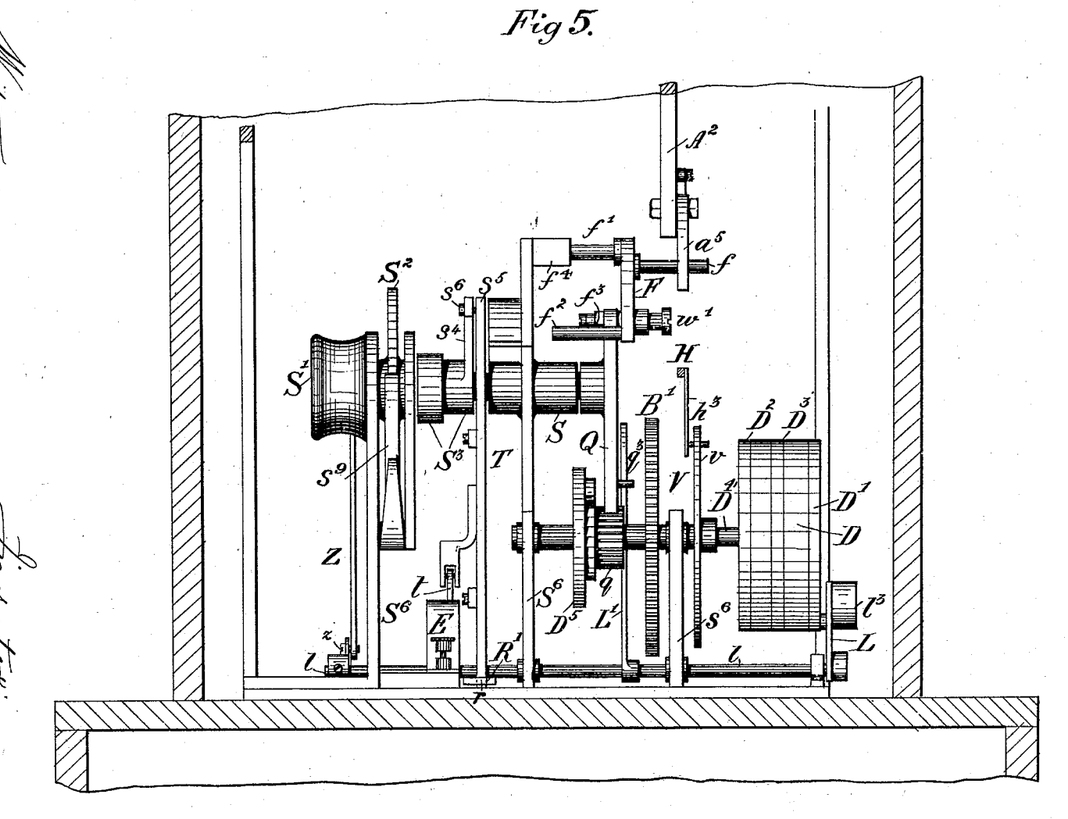
Fig. 5 is a part sectional back end elevation.

First in regard to the coin-freed locking gear and operating mechanism. Any predetermined coin, token, or equivalent (hereinafter called "the coin") may be used, and the gear may be of any suitable type and in itself forms no part of my present invention. As illustrated in Figs. $2^a$, 3 and 4, A is a slide carrying writing materials stored in a casing above it, and having a suitable handle $A^0$. On the lower part of the slide A at the front end are centered two downwardly-projecting pawls $a$ connected by a cross bar $a'$ having a projection $a^0$ and the said pawls are normally held geared with twin racks $a^2 a^2$ by a spring $a^8$; $A'$ is the coin slot so arranged that when a coin X, Fig. 4, is inserted and the slide A pulled out, the said coin engaging the projection $a^0$ will lift the pawls clear of the racks so that the slide A is free to be pulled out, thereby delivering the lowest packet of the writing materials. One pawl $a$, Figs. 3 and 4, has a tail $a^3$ with a lateral pin $a^6$ which, when the pawls are lifted and the slide pulled out, is depressed and engages back rack $a^4$ so as to prevent the slide being pushed back without having been first fully pulled out, and it also prevents the pawls re-engaging the racks $a^2$ during the outward stroke; after the projection $a^0$ has cleared the coin the latter is free to fall into any suitable receptacle. On the return of the slide the pin $a^6$ of tail $a^3$ runs above the inverted rack and so clears its teeth. $A^2$ is a depending arm fixed to slide A, carrying at its foot a spring-pressed tappet arm $a^5$ which operates the telegraph mechanism during its forward travel, but is inoperative on its return travel.

Secondly, in regard to the electric call and transmitting or telegraph gear. The type of instrument illustrated is one in which constant currents are employed and which works in a closed circuit; the call is given by interruption of the current produced by breaks in the circuit: these breaks are caused during the revolution of a contact wheel D (hereinafter called the "call wheel") which consists of an insulated drum D, having three electrically connected metallic rings $D'$, $D^2$, $D^3$ let into its periphery. Ring $D'$ is plain and rubs against a fixed contact C in the main circuit. Ring $D^2$ has notches $d^2$ the characteristics of which constitute the predetermined and identifying signal and serve to break the current passing through contact C to a second and movable contact switch $C'$ also in the circuit. The ring $D^3$ has notches $d^3$ of different characteristics from those on ring $D^2$, and its use is hereinafter described in reference to the private messenger's call. The call wheel D is carried upon spindle $D^4$ mounted in bearings in standards $S^6$. To transmit the predetermined signal the call wheel D must perform one complete revolution and to regulate and easily control the speed thereof and for a purpose hereinafter described in reference to timing gear—a train of wheels $B'$, $B^2$ and a fly $B^3$ are provided and suitably mounted. The fly is driven by a pawl B, Fig. $2^a$, to prevent sudden shock when the call wheel D has completed a revolution and transmitted the signal. Upon spindle $D^4$ is a loose pinion $q$ gearing with a quadrant Q and free to revolve during its forward stroke. Said pinion is fast to ratchet wheel $q'$ which gears during the backward stroke of the quadrant with a pawl $q^2$ upon a disk $D^5$ fast on spindle $D^4$, as separately shown in Fig. 6, so that it will thus drive the call wheel D through its required revolution. The quadrant Q is centered on the end of main spindle S carried in bearings in suitable standards $S^6$ above which point is centered upon it on a pin $w'$ a tumbler F hereinafter fully described. From the same pin $w'$ by a cord $w$ passing over a suitable guide pulley is suspended the main driving weight W which is raised during the forward stroke of the quadrant Q by the power applied on withdrawal of slide A, and which retracts the said quadrant by its fall, then as explained revolving the call wheel D; the single revolution of this is determined by stop $d'$ affixed thereto engaging projection $l^2$ on a lever L mounted on an oscillating shaft $l$ running transversely across the machine. To raise the said lever L in time to cause projection $l^2$ to come in the travel of stop $d'$ a lever $L'$ is so fixed upon the shaft $l$ as to engage a pin $q^3$ upon face of quadrant Q at the end of its back stroke and thus serve to oscillate the shaft $l$ and raise lever L. The lever L is depressed in time to free the stop $d'$ by means of the counterweight $l^3$ when on return stroke of quadrant the pin $q^3$ is removed.

To prevent tampering with the apparatus during the transmission of a call the following arrangement of mechanisms is employed: The tumbler F carries a pin $f$ on its face which is the main operating pin and is extended into the line of travel of the tappet $a^5$. The oscillation of the tumbler F is limited in a forward direction by engaging a stop $q^5$ on quadrant Q and in a backward direction by engaging spindle S or a boss thereupon: a pin $f'$ on back of the tumbler F serves to replace F in its forward position by engaging, during the latter part of its back stroke, stop $f^4$ on standard $S^6$; the back pin $f^2$ is acted upon by fixed spring $f^3$ constantly forcing the tumbler F backward, as hereinafter explained.

Thirdly, in regard to the timing gear; the object of this is to prevent (where a number of apparatus are used in one electric circuit) any machine interfering with the line or any other machine when in action, until such action is completed, and the line again clear; also to provide that when the line is so cleared after any single action, each machine shall in turn be free to send its call (if any has been stored in it by an operator) and no two shall be so freed and operative simultaneously. To effect this it is necessary that the pulling out of any one slide shall immediately prevent that machine and every machine for working from a given period of time, and that such periods of time shall be different in every machine on the same circuit, so that the machine which is set for the shortest period of retardation will first be free to act, and then each other one will be automatically released and rendered operative in turn, according to its prearranged period of retardation, and will on the transmission of the call render operative all other machines again in turn.

The timing gear illustrated is as follows:— On the same spindle S as the aforesaid quadrant Q is fixed a switch lever T having at its foot a tappet arm $t$ adapted to depress a spring contact E placed in the circuit during the forward motion of the quadrant Q and so break the circuit, and on its return to ride inoperatively over the said contact E. G is a weighted brake applied to the fly $B^3$ for the purpose of preventing the raised weight W from falling and so store its power. To remove this brake at the proper times, a timing lever H is provided having a counter weight $H'$ for lifting it and a dashpot $h$ for regulating its speed of ascent. The dashpot is of the well known "pump" type so that it will quickly fall but its ascent is retarded. For depressing the lever H in order to apply the brake, a weight $h^2$ is provided and suitably connected to the armature $m$ of an electric magnet M in the main circuit which is attracted when a current is passing. To prevent the descent of the timing lever H (and the consequent action of brake G during transmission of a call), a projecting arm $h^3$ is fixed on the lever H, and upon the spindle $D^4$ is mounted a flat disk V having a slot $v$ in the periphery: the arm $h^3$ riding upon the periphery of the disk V holds up the lever H, until return of the slot, when the arm $h^3$ will pass down and allow the timing lever H to fall. While the brake is on I may employ a bypass for the current, so that in case of the connections being broken by depression of the contact E in any other machine the circuit cannot be broken. This bypass remains operative while the timing levers in all the machines are in depressed positions but as soon as they resume normal upward positions the bypass is cut out. I do not deem it necessary to illustrate the bypass, as it is an expedient familiar to those skilled in the art.

Figures 6, 7, 8, 9, 10, 11, 12:
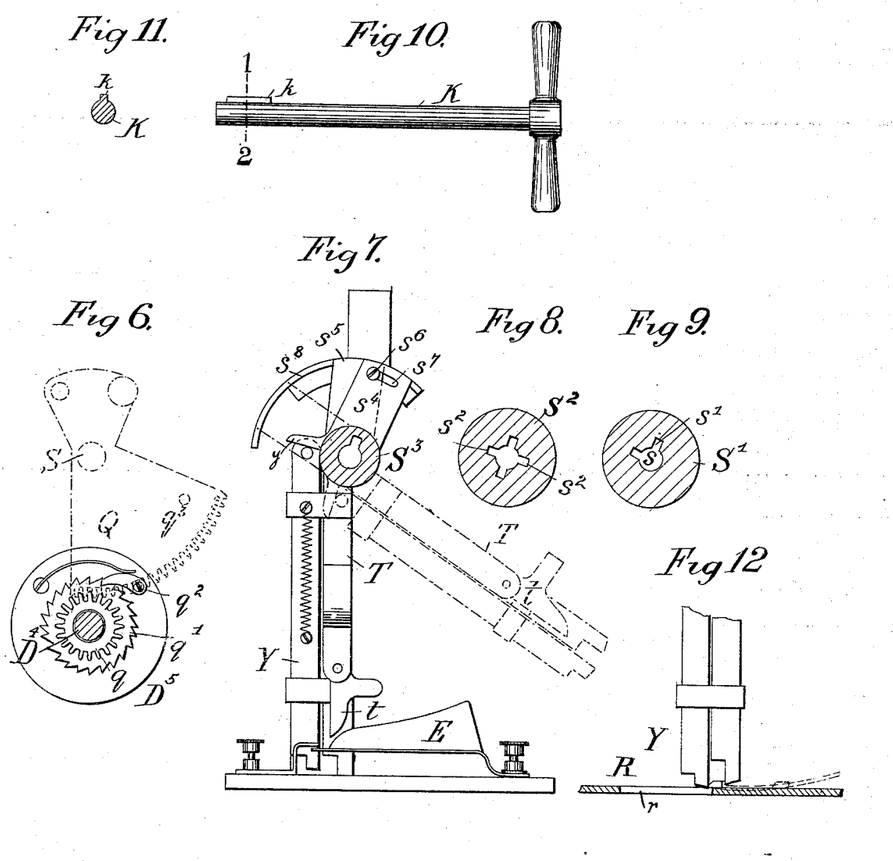
Fig. 6 is a detail of driving ratchet wheel and pawl.
Fig. 7 is a detail of messenger call apparatus.
Figs. 8 and 9 are sections showing key ways for the same hereinafter explained.
Fig. 10 is an elevation of key.
Fig. 11 is a section on line 1—2 thereof.
Fig. 12 is a detail of foot of switch levers.

Fourthly, in regard to the additional messenger's private call apparatus. This is for the purpose of permitting the messenger (on his arrival in answer to a public or operator's call) to send to the central or receiving station a distinctive call, for example, that a second messenger is required when two messages are in the receptacle, and such private call is distinct from the public call. For this purpose the ring $D^2$ is provided on call wheel D having differently arranged spaces or notches $d^2$ $d^2$ on its periphery serving to distinguish it from ring $D^3$ and to identify the machine and the contact switch $C'$ is arranged to be moved across transversely between the public call ring $D^3$ and the said private call ring $D^2$—a suitable plate connecting these two at the point where the contact $C'$ travels across the same, so that the electric circuit shall not be broken during the operation. The cross movement of the contact switch $C'$ is effected by the vibrating lever R and sliding bar $R'$ illustrated in Figs. 1, 2, 3, and 4. The messenger carries a key K of the form shown in Figs. 10 and 11, having a feather $k$ for the purpose of enabling him to wind up the weight W and store power in the machine for subsequent use. The key hole $s$ passes through three independent parts before reaching and acting on the main winding spindle S. These three parts are an exterior boss $S'$ mounted upon a standard $S^6$ and provided with two key ways $s'$; second, a loose ratchet wheel $S^2$ in whose boss, Fig. 8 are four key ways $s^2$, and third, a boss $S^3$ mounted upon, but not fixed to the end of the winding spindle S with one internal key way, Fig. 7, and having two external laterally projecting arms $s^4 s^5$. One of these the arms $s^5$ carries a stop $s^6$ which passes through a slot $s^7$, see Fig. 7, in the other arm so that the first arm $s^4$ can have some travel before operating the other $s^5$ which serves to drive the winding spindle S, the travel being limited by the stop piece $s^8$. The ratchet $S^2$ is geared with a pawl $s^9$ to prevent back action: upon the boss $S^3$ is a finger $y$ which when turned at once depresses a spring return bar Y causing its foot to gear with a slot $r$ in the sliding contact bar $R'$, see Fig. 12, and move the same for the purpose of throwing the switch $C'$ from the public to the private ring of the call wheel D. The parts when operated take the position dotted in Fig. 7. To prevent the messenger inserting his key when a message is already stored by a public operator, a rod Z connected to cross spindle $l$ aforesaid by means of a short lever $z$ passes through a hole in the boss $S'$, and when the weight W is lifted for the purpose of sending a public call the rod Z projects across the keyhole $s$ and so prevents the insertion of the key, as illustrated in Fig. 3, but when no power is stored by the weight W the rod Z is withdrawn and the hole is clear.

In describing the operation of a number of machines such as are above described but all with distinctive call wheels and all in the same electric circuit, assuming the line is clear and the circuit consequently closed, a current will be flowing round the circuit and all the electro magnets M will be made and their armatures attracted. This will hold up all the weights $h^2$ and all the timing levers H will be in their upward position and the brakes G off. Then after the insertion of a coin and the freeing of the locking mechanism as hereinabove described, the first part of the outward stroke of a slide A through tappet $a^5$ and the tumbler F turns the quadrant Q and spindle S causing lever T to depress the switch E and instantly break the circuit, so that the electro-magnets M in all the machines release their armatures and apply the brakes G. The further motion of the slide A clears lever T from spring switch E which then recloses the circuit allowing all magnets to again attract and lift their armatures, and the balance weights H' then slowly raise the timing levers H and take off the brakes, not simultaneously, but each one successively in turn, according to the prearranged periods of retardation as affected by the dashpots described. The further pull of the slide fully lifts the weight and disengages tappet $a^5$ from pin $f$ of tumbler F. The pin $q^3$ has during the travel of the quadrant Q been withdrawn from lever L' so that the counterweight $l^3$ will depress lever L and remove projection $l^2$ hitherto by stop $d'$ locking the call wheel D which is then free to revolve and transmit its message if the line is clear, and the brake G lifted as described. When weight W falls it retracts tumbler F until pin $f'$ thereon engages stop $f^4$; the further pull of the falling weight then causes the tumbler F to revolve in a forward direction on its own center $w'$ until its front edge engages stop $q^5$ on quadrant Q, at which time the operating pin $f$ will be in the line of travel of the tappet $a^5$ so that when the slide is again pulled out it will force forward the tumbler F and through stop $q^5$ actuate also the quadrant Q, and at the same time lift the weight W again and store power. When the slide has again been withdrawn, after a certain travel tappet $a^5$ will ride over and cease to engage pin $f$, and spring $f^3$ acting on pin $f^2$ will then force back tumbler F to its full backward position, and so move the pin $f$ out of line of the tappet $a^5$. Thus the slide may be left in any intermediate position without liability to be operated again until the weight has fallen and transmitted the call; but if the line is engaged and the brakes applied then the power stored by the weight W is retained until the line is free. When the wheel D begins to revolve, the disk V on the same spindle revolving under the arm $h^3$ on lever H holds up the timing lever H and so prevents the interruption of the current (caused by the message) acting to apply the brake to the machine in action, while allowing the same to be applied in all other machines. On revolution of the call wheel D after the last notch $d^3$ has passed the fixed contact C the circuit is again closed and the brakes successively released in each machine. If in the meantime any machine has been used and so has its weight lifted it will despatch its call as soon as its turn comes and its brake is released. The brake in the current due to the message will once more cause the brake to be applied to all except the machine in action. It will thus be seen that the first action is to open the circuit which applies the brakes to every machine (including the one in use) and so prevents any operation until the lapse of a time varying in each machine as set forth and then each machine in turn is free to act if its weight is lifted, but the moment anyone starts it relocks all the others and at the completion of its operation each in turn is again freed. On arrival of a messenger he can lift the weight by his special key (if he desires to call the receiving office) instead of by operating the slide. This moves the switch C' from the public call $D^3$ to the private call $D^2$, the operation otherwise being the same as above described for the public call.

As above stated the machines described are intended for use on a closed circuit and a constant current, but I wish it to be understood that I do not limit myself to this as it is obvious that the same result can be attained by providing a battery in each machine and arranging the transmitting mechanism to cut the said battery in and out at each operation.

I have set forth under each of the four main heads above stated one type or set of each mechanism required to effect the combined purposes, but I wish it to be understood that the mechanisms are only typical and may obviously be varied and modified to effect the same ends. Therefore I do not confine my invention to any specific arrangements of apparatus for performing same.

Having now particularly described and ascertained the nature of my said invention and in what manner the same is to be performed, I declare that what I claim is—

1. In an electric call apparatus for use with others of like character in one electric circuit, the combination with a coin-freed locking mechanism, of a switch and mechanism intermediate said switch and coin-feed locking mechanism whereby on the operation of any one machine the condition of the circuit will be at once changed so as to lock all the machines in the circuit and prevent the transmission of a call or message by any of them (including the one operated) until after the lapse of pre-arranged periods of time, and means, substantially as described, for varying such periods of time for each machine so that each machine will in its turn be freed and in condition to transmit its call if required, substantially as specified.

2. In an electric call apparatus for use with others of like character in one electric circuit, the combination with the coin-freed locking mechanism, and a call transmitting mechanism, of a train of wheels connected with said transmitting mechanism and having a brake G, a moving part such as the timing lever H, having a counterweight H' for lifting it and a dash pot $h$ for regulating its speed of ascent, and an electro-magnet M having a weighted armature $m$ connected to and acting on said timing lever, whereby each machine in the circuit is adapted to retard and transmit in its turn a predetermined call, no two machines acting simultaneously, substantially as set forth.

3. The combination with an electric call transmitting mechanism, of a coin freed locking mechanism comprising the slide A having a tappet $a^5$, the quadrant Q geared with said transmitting mechanism and having a pin $w'$, the tumbler F mounted on the pin $w'$ and provided with a pin $f$ to be engaged by the tappet $a^5$, and the weight W suspended from a cord attached to the pin $w'$ for operating the transmitting mechanism and storing power by the outward movement of the slide, whereby the slide may be left in any intermediate position (after having stored power) without interfering with the return to normal position of the transmitting mechanism, substantially as set forth.

4. The combination of the call wheel D, the timing lever H, a brake mechanism, the arm $h^3$, the slotted disk V adapted to move with the call wheel, for holding up the timing lever during transmission of a call and preventing application of the brake device in the acting machine while at the same time allowing application of the brakes in all other machines in the same electric circuit, and a coin freed locking mechanism, substantially as set forth.

5. The combination of the call wheel D having mounted thereon a private call ring $D^2$ and a public call ring $D^3$, the contact switch C', means for moving said switch from the public call ring to the private call ring, and a coin freed locking mechanism, substantially as set forth.

6. The combination of the call wheel D having a private call ring $D^2$ and a public call ring $D^3$, the contact switch C', the quadrant Q having pin $w'$, the weight W suspended from a cord attached to said pin, means for raising said weight to store power and move the switch from the public call to the private call, and a coin freed locking mechanism, substantially as set forth.

7. The combination with an electric call transmitting mechanism comprising the call wheel D having separate call rings $D^2$ and $D^3$, and the switch C', of the quadrant Q geared with the transmitting mechanism, the weight W connected with said quadrant, the winding spindle S having an exterior spindle S', the cross spindle $l$ carrying a lever $z$, a rod Z connected to said spindle by said lever and adapted to project across a keyhole in the winding spindle and prevent insertion of the messenger's key when a message is already stored, and a coin freed locking mechanism substantially as set forth.

In witness whereof I have hereunto set my hand in presence of two witnesses.

GRAYDON POORE.

Witnesses:
 JOSEPH C. CHAPMAN,
 T. F. BARNES.